United States Patent
Raad et al.

(10) Patent No.: US 10,801,910 B2
(45) Date of Patent: Oct. 13, 2020

(54) VEHICLE FORCE IMBALANCE DETECTION

(71) Applicant: Ford Global Technologies, LLC, Dearborn, MI (US)

(72) Inventors: Joseph M. Raad, Farmington, MI (US); Daniel F. Slavin, Northville, MI (US); Darrel Alan Recker, Ypsilanti, MI (US); Kelly Trost, Plymouth, MI (US); Fakhreddine Landolsi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 163 days.

(21) Appl. No.: 16/043,476

(22) Filed: Jul. 24, 2018

(65) Prior Publication Data

US 2020/0033220 A1 Jan. 30, 2020

(51) Int. Cl.
*G01M 1/28* (2006.01)
*G01M 17/013* (2006.01)
*B60C 23/06* (2006.01)
*B60C 23/04* (2006.01)

(52) U.S. Cl.
CPC ............. *G01M 1/28* (2013.01); *B60C 23/062* (2013.01); *G01M 17/013* (2013.01); *B60C 23/0408* (2013.01)

(58) Field of Classification Search
CPC ..... G01M 1/28; G01M 17/013; B60C 23/062; B60C 23/0408
See application file for complete search history.

(56) References Cited

U.S. PATENT DOCUMENTS

| 4,907,452 | A | 3/1990 | Yopp |
| 5,557,552 | A * | 9/1996 | Naito ..................... B60C 11/24 340/438 |
| 6,353,384 | B1 | 3/2002 | Kramer |
| 6,834,222 | B2 | 12/2004 | Lu et al. |
| 8,219,283 | B2 | 7/2012 | Recker et al. |
| 8,660,742 | B2 | 2/2014 | Champagne et al. |
| 9,046,050 | B2 | 6/2015 | Worden et al. |
| 2002/0059826 | A1* | 5/2002 | Ono ...................... B60C 23/061 73/146.5 |
| 2003/0006890 | A1* | 1/2003 | Magiawala ........... B60C 23/061 340/438 |
| 2004/0172181 | A1* | 9/2004 | Lu ......................... B60C 23/061 701/36 |
| 2015/0094912 | A1 | 4/2015 | Sukaria et al. |
| 2016/0209291 | A1 | 7/2016 | Pita-Gil et al. |

FOREIGN PATENT DOCUMENTS

| CN | 202362116 U | 8/2012 |
| EP | 3002576 A1 | 4/2016 |

* cited by examiner

*Primary Examiner* — Aaron L Troost
(74) *Attorney, Agent, or Firm* — Raymond L. Coppiellie; Bejin Bieneman PLC (57) ABSTRACT

A system includes a computer including a processor and a memory, the memory storing instructions executable by the processor to identify a wheel having a force imbalance based on wheel speed data from each of a plurality of vehicle wheels, and to identify a wheel force imbalance fault when the force imbalance exceeds at least one of a distance threshold and a time threshold.

19 Claims, 7 Drawing Sheets

VEHICLE FORCE IMBALANCE DETECTION

BACKGROUND

Vehicles typically include a plurality of wheels. The wheels typically support their weight evenly about the circumference of the wheel. Over time, the wheels may become imbalanced, i.e., the weight distribution of one of the wheels is uneven about the circumference of the wheel. Imbalanced wheels may cause vibrations and/or tire wear. However, it is a problem to detect imbalanced wheels and/or a persistence of the imbalanced wheels. For example, it is a problem to detect respective forces, e.g., centripetal forces, generated by each of the one or more wheels of a vehicle. It is also a problem to distinguish between persistent vibration from an imbalanced wheel and transient vibration from external sources, e.g., a temporarily flat spotted tire, snow or other debris on the tire, etc. Further, if a vehicle is operated autonomously, i.e., a human occupant is not present or is not monitoring vehicle operation, conventional symptoms of a wheel force imbalance, e.g., vehicle vibrations or steering wheel nibble, are not useful in identifying a wheel force imbalance, which could result in additional wear on the vehicle and tires. Vibrations may also be perceived as poor vehicle quality.

DETAILED DESCRIPTION

A system includes a computer including a processor and a memory, the memory storing instructions executable by the processor to identify a wheel having a force imbalance based on wheel speed data from each of a plurality of vehicle wheels and identify a wheel force imbalance fault when the force imbalance exceeds at least one of a distance threshold and a time threshold.

The instructions can further include instructions to apply a tuned resonance filter to filter at least one of road noise and vibrations from road variation.

The instructions to identify one of the wheels can further include instructions to identify a plurality of peaks of the wheel speed data.

The instructions to identify the wheel force imbalance fault can further include instructions to determine at least one of the distance threshold and the time threshold based on a magnitude of the force imbalance.

The instructions to collect wheel speed data can further include instructions to determine that a vehicle is moving straight and then and only then to start collecting the wheel speed data from the wheels of the vehicle. The instructions to determine that the vehicle is moving straight can further include instructions to determine, from the wheel speed data, a first wheel speed for a first front wheel and a second wheel speed for a second front wheel and to determine that the vehicle is moving straight when the first wheel speed is within a predetermined speed threshold of the second wheel speed.

The instructions to collect wheel speed data can further include instructions to determine that a period of time from initiation of a vehicle exceeds a predetermined distance and then to start collecting the wheel speed data from the wheels of the vehicle.

The instructions to identify one of the wheels can further include instructions to identify a sine wave indicating a variation of the wheel speed from the wheel speed data.

The instructions to identify the wheel force imbalance fault can further include instructions to determine whether the wheels require immediate repair based on a magnitude of the force imbalance.

The instructions to identify the wheel force imbalance fault can further include instructions to determine a magnitude of the force imbalance and then to identify the wheel force imbalance fault when the magnitude exceeds a magnitude threshold.

The instructions can further include instructions to determine whether an identified second wheel has a second force imbalance and to identify a wheel force imbalance fault for the second wheel when the second force imbalance exceeds at least one of the distance threshold and the time threshold.

A method includes collecting wheel speed data for each of a plurality of vehicle wheels, identifying one of the wheels having a force imbalance based on the wheel speed data, and identifying a wheel force imbalance fault when the force imbalance exceeds at least one of a distance threshold and a time threshold.

The method can further include applying a tuned resonance filter to filter at least one of road noise and vibrations from road variation.

The method can further include determining at least one of the distance threshold and the time threshold based on a magnitude of the force imbalance.

The method can further include determining a magnitude of the force imbalance and then identifying the wheel force imbalance fault when the magnitude exceeds a magnitude threshold.

A system includes a plurality of vehicle wheels, a respective wheel speed sensor for each vehicle wheel, means for collecting wheel speed data for each of a plurality of vehicle wheels, means for identifying one of the wheels having a force imbalance based on the wheel speed data, and means for identifying a wheel force imbalance fault when the force imbalance exceeds at least one of a distance threshold and a time threshold.

The system can further include means for applying a tuned resonance filter to filter at least one of road noise and vibrations from road variation.

The system can further include means for determining at least one of the distance threshold and the time threshold based on a magnitude of the force imbalance.

The system can further include means for determining whether the wheels require immediate repair based on a magnitude of the force imbalance.

The system can further include means for determining a magnitude of the force imbalance and then identifying the wheel force imbalance fault when the magnitude exceeds a magnitude threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Shortcomings in identifying a force imbalance are addressed by detecting and analyzing forces on vehicle wheels to identify the force imbalance. The solution can further detect whether a force imbalance is caused by an imbalanced wheel or from external sources, e.g., variations in road grade, turning of the vehicle, etc. Further still, it is advantageously possible to detect whether the force imbalance persists over a predetermined distance and/or time.

By using wheel speed data to determine a force imbalance generated by the wheels of the vehicle, the computer can identify a specific wheel that is imbalanced and can determine a persistence of the force imbalance. Filtering the wheel speed data with a tuned resonance filter can remove variations in the wheel speed data that result from external sources and not from the force imbalance, e.g., variations in road grade, engine noise, shake from a misaligned front end, wind, suspension resonance, reduced friction from precipitation, debris (e.g., mud, snow, ice) on the wheel 155, etc. The computer thus can detect the force imbalance from the data with minimal or no influence from external sources. Upon detecting or identifying the specific imbalanced wheel, further detecting the persistence of the force imbalance can allow service workers at a repair location to determine a potential imbalanced wheel that can indicate damage to the vehicle.

Figure 1:
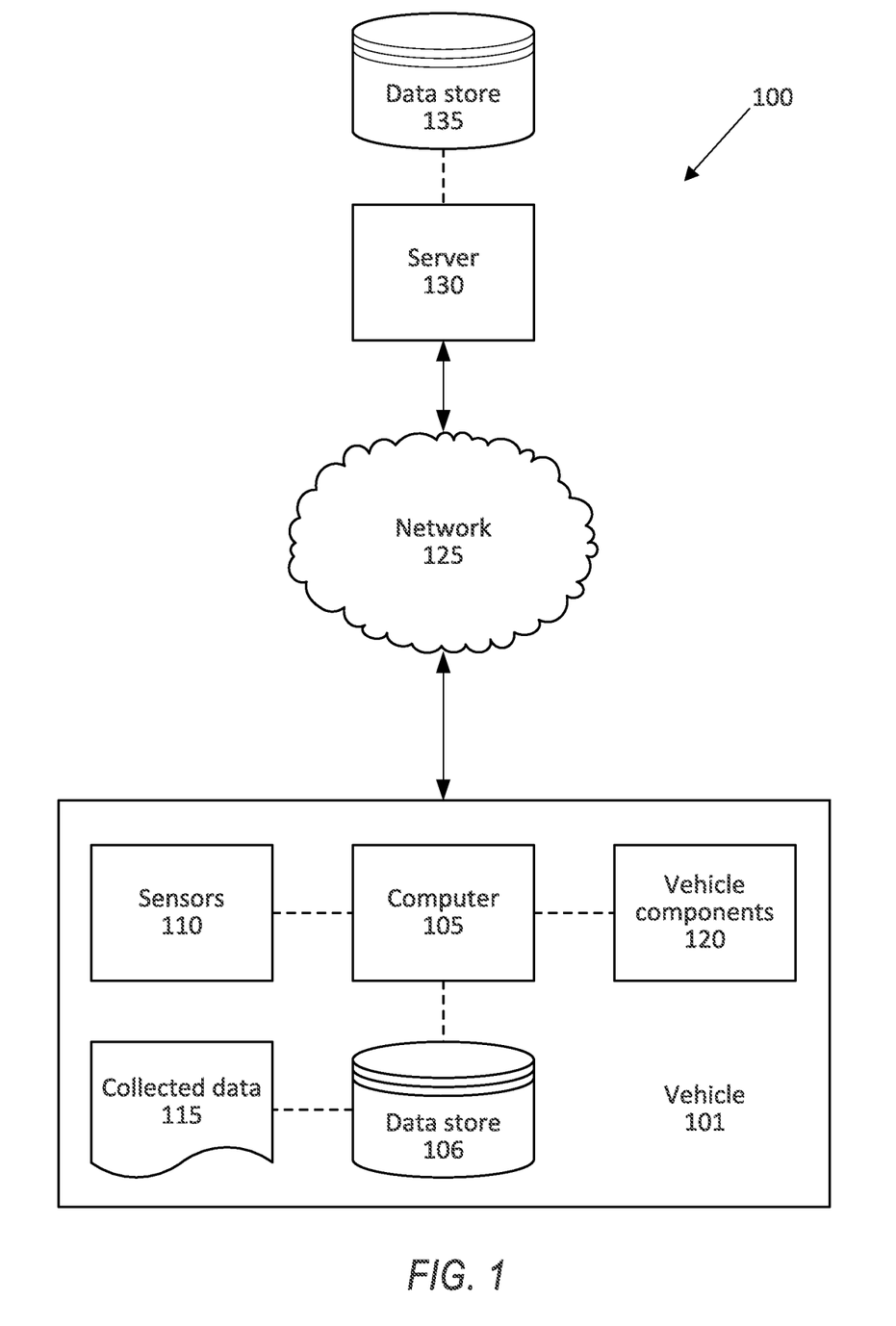
FIG. 1 is a block diagram of an example system for detecting a force imbalance on vehicle wheels.

FIG. 1 illustrates an example system 100 for detecting force imbalance generated by wheels of a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
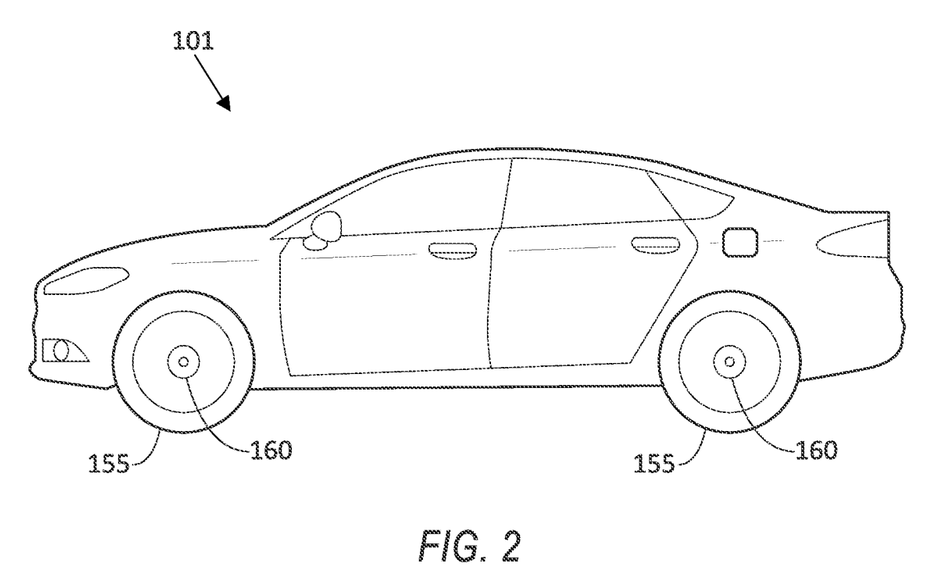
FIG. 2 is an example vehicle.

FIG. 2 illustrates an example vehicle 101. The vehicle 101 includes a plurality of wheels 155, and the example of FIG. 2 shows two of four total wheels 155. The wheels 155 support a vehicle 101 body and allow the vehicle 101 to move along a roadway or the like. Each wheel 155 has a respective wheel speed sensor 160. The wheel speed sensor 160 detects rotation of the wheel 155 and outputs a rotational speed thereof.

The computer 105 can detect a force imbalance. As used herein, a "force imbalance" is defined as at least one determined force generated by one of the wheels 155 exceeding a predetermined force threshold. The force imbalance can be caused by one of the wheels 155 having an uneven distribution of weight about a circumference of the wheel 155 and/or a tire attached to the wheel, e.g., an asymmetric (i.e., non-circular or out-of-round) wheel 155 that causes a force applied to a suspension attached to the wheel 155. For example, the weight distribution about the wheel 155 can be uneven when, e.g., one of the tires on one of the wheels 155 is out of round, one of the wheels 155 is mismounted, etc. The uneven weight distribution generates centripetal forces radially extending from the center of the wheel 155 toward an unevenly weighted portion of the wheel 155. Because the suspension is connected to the center of the wheel 155, the centripetal forces pull on the suspension as the wheel 155 rotates, generating a vibration as the unevenly weighted portion of the wheel 155 rotates about the circumference of the wheel 155. That is, the unevenly weighted portion of the wheel 155 can cause the wheel 155 to rise and fall relative to the suspension, causing the suspension to rise and fall. The rising and falling of the suspension results in a vibration that is proportional to the rotating speed of the wheel 155, i.e., the wheel speed. The suspension can absorb a portion of the vibration, and the remaining vibration can be transmitted to other vehicle components 120, e.g., a steering wheel, a seat, etc. The uneven weight distribution can cause the wheel 155 to rotate at differing speeds, e.g., speeding up and slowing down during each rotation of the wheel 155, which can cause wear on a tire.

The computer 105 can determine a specific wheel 155 that requires service based on the determined forces generated by the wheels 155. As described below, the computer 105 can use the wheel speed data 115 to determine determined forces generated by each wheel 155. If the determined force generated by one of the wheels 155 exceeds a force threshold, the force threshold based on the empirical testing described below, the computer 105 can determine that there is a force imbalance and can identify the wheel 155 having the determined force as the imbalanced wheel 155. The computer 105 can identify a wheel force imbalance fault upon detecting the imbalanced wheel 155. The computer can send a notification over the network 125 to a user device (e.g., a smartphone, a tablet, etc.) and/or to the server 130 and/or to a computer at a repair location indicating the imbalanced wheel 155.

A wheel 155 is "imbalanced" when the wheel 155 has a physical characteristic, e.g., tires are out of round, the tires are mismounted, the tires are degraded, the axles are imbalanced, etc., resulting in the wheel 155 generating a centripetal force absorbed by the suspension during each revolution of the wheel 155. A force imbalance can mean, depending on other forces, e.g., caused by a road grade, etc., that there is an imbalanced wheel, and replacing the imbalanced wheel can resolve the force imbalance. When one or more of the wheels 155 is imbalanced, one or more components 120 may require repair or replacement, e.g., a tire may require replacement and/or alignment, a rim may require repair, the wheel 155 may require rebalancing, etc. The force imbalance caused by the imbalanced wheel can cause tire wear and vibration in other vehicle components 120, e.g., a steering wheel, a seat, etc. For example, a wheel 155 can be imbalanced when, e.g., the vehicle 101 is exposed to temperature variations (e.g., sitting in the sun) that cause material deformation in the tire, creating flat spots in the tire and/or permanently distorting the tire. In another example, a wheel 155 can be imbalanced upon striking an uneven portion of a roadway (e.g., a pothole) that bends the rim of the wheel 155 out of round.

When the computer 105 operates the vehicle 101 in the autonomous mode, vibrations from an imbalanced wheel 155 may not be detected by a vehicle 101 operator and/or a vehicle 101 may not be occupied by a human person. For example, vibrations normally felt through a steering wheel may not be detected when the operator does not hold the steering wheel. This disclosure presents a solution to the problem of detecting a specific imbalanced wheel 155 using data 115 collected by the computer 105 without input from the operator.

Figure 3A:
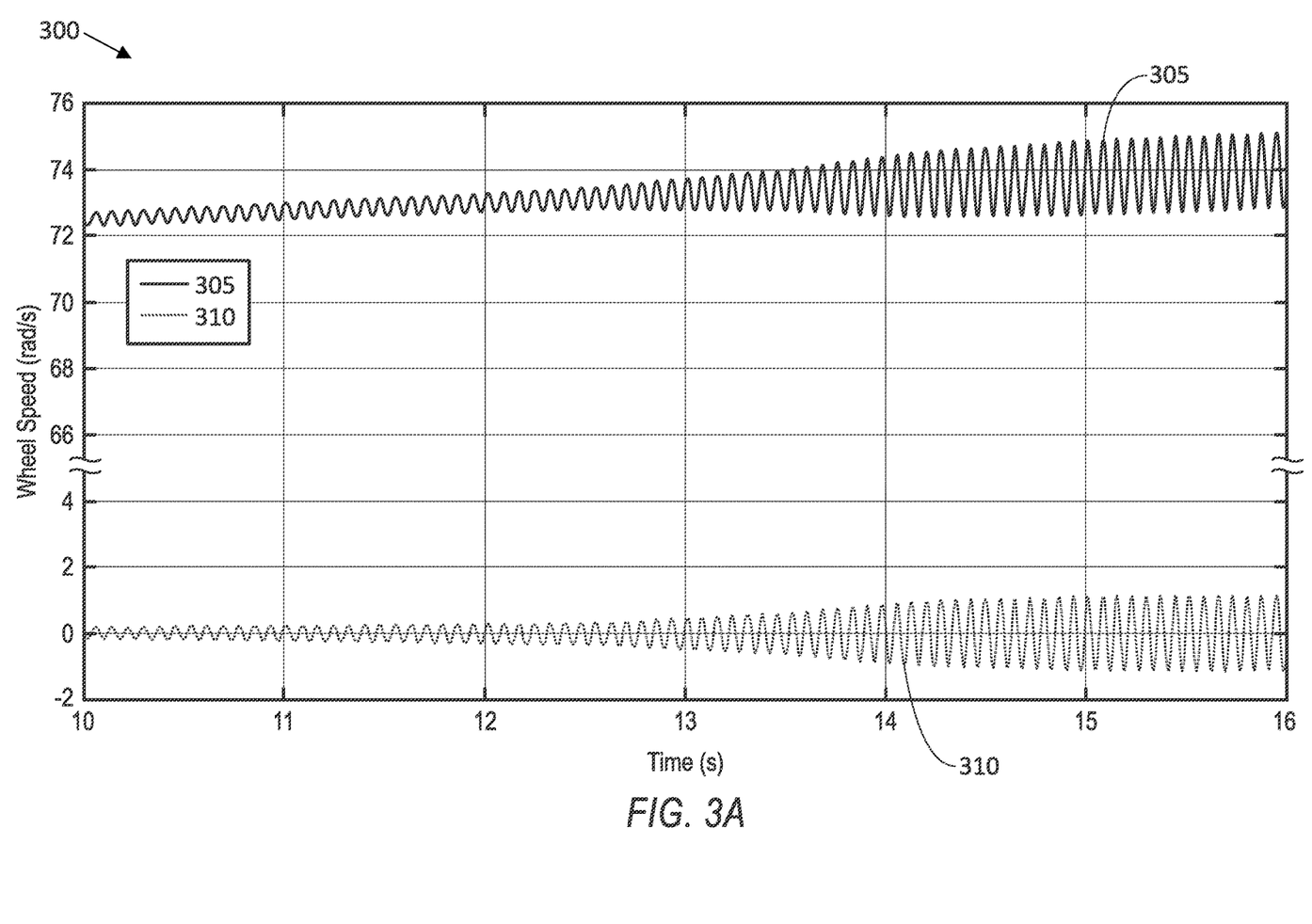
FIG. 3A is an example chart of wheel speed data collected from a vehicle wheel.

FIG. 3A illustrates a diagram 300 of example data 115 indicating raw wheel speed and wheel speed variations for one of the wheels 155. The diagram 300 has a horizontal axis showing time in seconds (s) from initiation of data collection. The diagram 300 has a vertical axis showing speed of the wheel 155 in radians per second (rad/s). The raw wheel speed data 115 are shown with the curve 305. In the example of FIG. 3A, the raw wheel speed data range from about 72-76 rad/s. The wheel speed variation data 115, as described below, are shown with the curve 310. In the example of FIG. 3A, the wheel speed variation range from about −2 to 2 rad/s.

The computer 105 can apply a filter to the raw wheel speed data 115. The filter can be, e.g., a notch filter, a band-pass filter, a high-pass filter, a low-pass filter, etc. The filter can remove variations in the speed data 115 that are caused by external sources, e.g., changes in road grade, changes in road condition, etc. For example, if the roadway has gravel, the speed for each wheel may be affected by the uneven road surface caused by the gravel. As shown in FIG. 3A, the raw speed data 115 can oscillate in sinusoidal manner in the curve 305. The computer 105 can apply the filter to the raw wheel speed data 305 to generate filtered speed data 115. The filtered speed data 115 can be converted with a conventional vehicle 101 tire conversion algorithm based on a size of the wheel 155 into a frequency measured in revolutions per second, i.e., Hertz (Hz). The frequency can be converted between radians per second (rad/s) and Hz using a unit conversion, i.e., 1 Hz=2π rad/s. For example, the tire conversion algorithm can be a Fourier transform applied to the filtered speed data 115 to identify a plurality of frequencies that compose the filtered speed data 115. The variations in the speed data 115 can be shown as specific ranges of frequencies determined from the Fourier transform. The filter can be selected to remove the frequencies in the specific ranges from the wheel speed variations from the external sources. That is, the external sources typically introduce frequencies in known ranges, determined through empirical testing, that can be removed with the filter. For example, the wheel 155 can vibrate at a resonant frequency, determined through empirical testing, and the filter can remove the resonant frequency from the plurality from frequencies. Thus, the computer 105 can determine the wheel speed as the remaining frequency (in Hz) of the filtered wheel speed data 115. Based on the remaining frequency, the computer 105 can tune the tuned resonance frequency to filter frequencies from the raw speed data 115 that are not the remaining frequency corresponding to the wheel speed.

Using wheel speed data 115 from wheel speed sensors 140, as described below, the computer 105 can apply a tuned resonance filter to show the specific frequency from the wheel speed data 115 representing the wheel speed. A "tuned resonance" filter is a band-pass filter that reduces the amplitudes of frequencies that are not a specified frequency, e.g., a resonant frequency, a frequency corresponding to a wheel speed, the remaining frequency described above, etc. The tuned resonance filter captures speed variations from raw speed data 115 at the specified frequency, removing variations resulting from sources external to the vehicle 101, e.g., road grade, road conditions, etc., and the wheel speed data 115 can then show the respective wheel speed for each wheel 155. The specified frequency range for the speed variations can be determined based on the filtered wheel speed data 115. Based on the respective amplitudes of the wheel speed variations, the computer 105 can determine if one of the wheels 155 is imbalanced.

The computer 105 can apply the tuned resonance filter to the raw wheel speed data 115 to filter all frequencies from the raw wheel speed data 115 except for the specified frequency corresponding to the wheel speed, as described above. Upon applying the tuned resonance filter to the raw wheel speed data 115, the remaining data 115 represent the wheel speed data 115 corresponding to wheel speed variations. Thus, the tuned resonance filter removes variations in the raw wheel speed data 115 resulting from external sources, and the remaining filtered wheel speed data 115 represents wheel speed variations from the wheel 155. In FIG. 3A, the curve 310 shows the result of the tuned resonance filter applied to the wheel speed data 115.

Figure 3B:
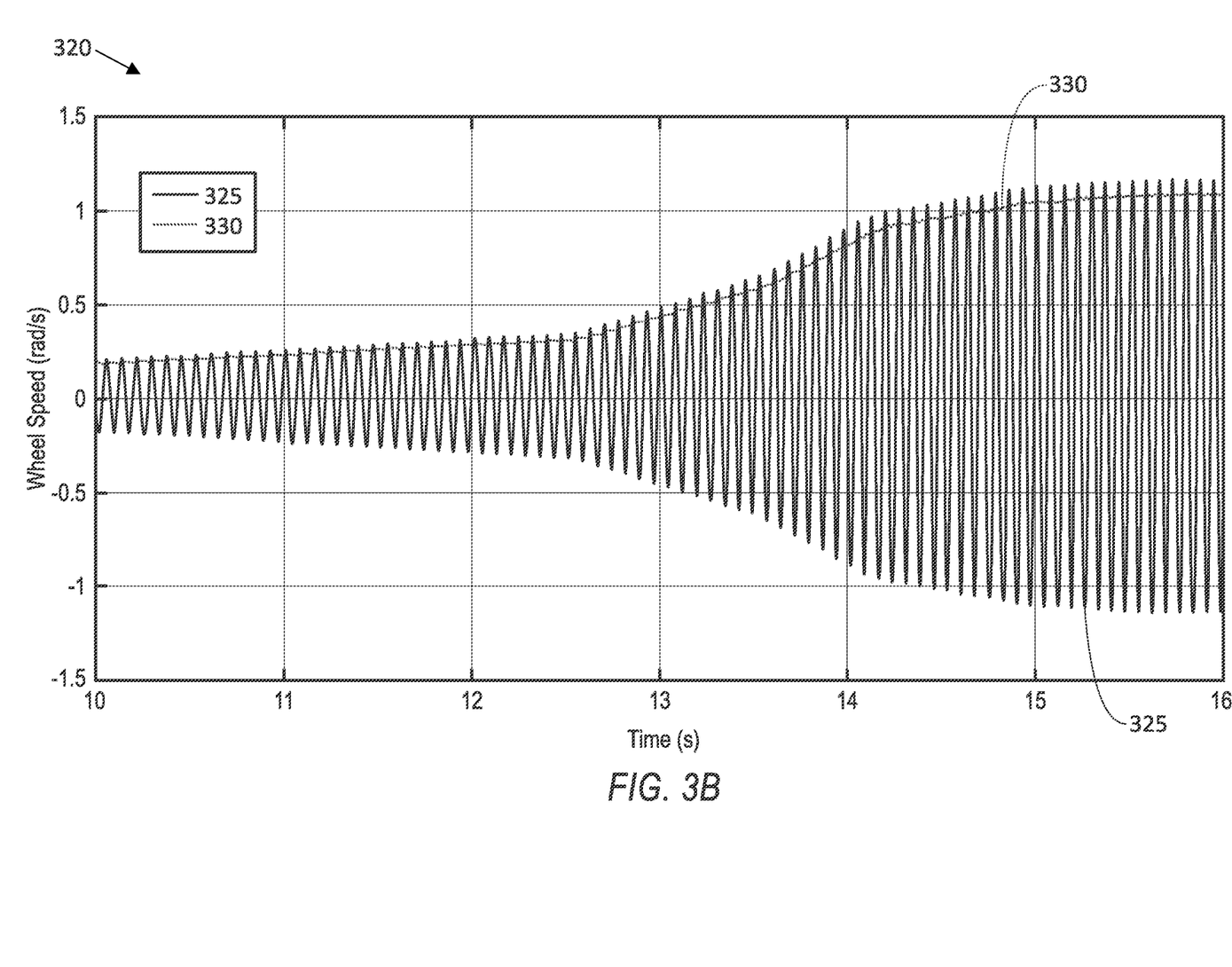
FIG. 3B is an example chart of wheel speed variation data determined from the wheel speed data shown in FIG. 3A.

Upon determining the wheel speed variation curve 310, the computer 105 can determine peaks of the curve 310. FIG. 3B shows a chart 320 with the filtered speed data 115 in a curve 325 and a magnitude of the filtered speed data 115, after applying peak detection, in a curve 330. The peaks indicate local maxima of wheel speed variations in a period defined by the frequency of the filtered wheel speed data 115 described above. That is, the frequency defines a period having a maximum that is a "peak" of the speed in a specific period. The computer 105 can apply a peak detection algorithm and a low-pass filter to determine an average peak magnitude of the wheel speed variations over a predetermined period of time, e.g., the period of time since initially collecting wheel speed data 115, represented in the curve 330. The computer 105 can retrieve a lookup table or the like correlating the average peak magnitude of the wheel speed variations to force values to determine the force value correlated to the average peak magnitude of the wheel speed. The lookup table could have two columns: one for the speed variation magnitudes, and one for the determined forces. The speed variation magnitudes can be determined based on data from empirical testing such as the data shown in FIGS. 3A-3B. The force values are determined forces on the suspension caused by the imbalanced wheel 155. The lookup table can be constructed by applying empirical tested forces onto specific wheel 155 and tire combinations and determining wheel speed variations resulting from those empirically tested forces. The resultant wheel speed variations can be used to determine a correlation between wheel speed variation magnitudes and forces applied to the wheel 155, and the correlation can be used to populate the lookup table. Thus, upon receiving the average peak magnitude of the wheel speed variations, the computer 105 can use the average peak magnitude of the wheel speed variations to obtain a determined force value from the lookup table to determine a determined force applied to the wheel 155.

The computer 105 can identify a first wheel 155 having a first force imbalance and a second wheel 155 having a second force imbalance. The computer 105 can determine whether the first and second force imbalances exceed a time threshold and/or a distance threshold, as described below, to determine whether the first and second force imbalances persist. When the first and second force imbalances persist, the computer 105 can determine that each of the first wheel 155 and the second wheel 155 are imbalanced and require repair.

The computer 105 can determine to detect the force imbalance when the vehicle 101 satisfies one or more startup conditions. As used here, a "startup condition" is at least one of a distance, a speed, and a speed range that indicate that a vehicle 101 is at a beginning of a predetermined route and transient external sources (e.g., tires warming up) can cause variations in the wheel speed data 115. The startup conditions can be determined to reduce variations in the wheel speed data 115 from external sources e.g., temporary flat-spotting of tires, tire warmup, curved roads, transient variations in speed, etc. The startup conditions can be determined to prevent false positive detections of force imbalance, e.g., from flat-spotted tires and/or debris on the wheel 155. The startup conditions improve the certainty that the detected force imbalance is the result of an imbalanced wheel 155, preventing unnecessary alerts to a user and/or unnecessary maintenance.

The computer 105 can determine to begin detecting the force imbalance when specific startup conditions are met. For example, the computer 105 can determine to begin detecting the force imbalance when a distance condition, a speed range condition, and a straightness condition are met. Alternatively, the computer 105 can determine to begin detecting the force imbalance when any combination of the distance condition, the speed range condition, the straightness condition, and the acceleration condition are met, e.g., when any one of the conditions are met, when any two of the conditions are met, when the distance condition and any one of the other conditions are met, etc. The computer 105 and/or the server 130 can determine which of the conditions should be met to begin detecting the force imbalance based on, e.g., predetermined empirical testing. For example, the empirical testing described above can include testing wheel and force imbalance combinations sampled at different vehicle 101 speeds, e.g., at 50 miles per hour, at 60 miles per hours, at 70 miles per hour, and at 80 miles per hour. As the vehicle 101 speed increases, the wheel speed variation can increase, and thus different empirical testing for different vehicle 101 speeds can improve determination of which conditions should be met to begin detecting the force imbalance.

The startup conditions can include a distance condition that is a predetermined distance from a start of a route followed by the vehicle. The distance condition can be determined to reduce variations in the wheel speed data 115 from, e.g., temporary tire deformities, tire warmup, etc. When the vehicle 101 begins the route, the computer 105 can actuate an odometer to determine the distance elapsed from the start of the route. For example, the predetermined distance could be 25 miles. When the distance elapsed exceeds the predetermined distance, the computer 105 can determine that the distance condition is satisfied.

The startup conditions can include a speed range condition that is a predetermined speed range in which the vehicle 101 must remain to reduce variations in the wheel speed data 115. The speed range condition can be determined to reduce wheel speed variations from transient vehicle 101 speed changes. Furthermore, the determined forces can vary based on vehicle 101 speed. Collecting data 115 when the vehicle 101 is in the speed range can improve consistency of the data 115 collected. The predetermined speed range can be determined from the empirical testing of forces from wheel 155 and tire combinations as described above. For example, the speed range could be 35-45 miles per hour. When the current vehicle 101 speed is in the predetermined speed range, the computer 105 can determine that the speed range condition is satisfied.

The startup conditions can include a straightness condition. The straightness condition is a measure that the vehicle 101 is moving substantially straight in the roadway, reducing wheel speed variations that can result from the vehicle 101 turning. When the vehicle 101 is not moving substantially straight in the roadway, the wheels 155 can receive additional forces, e.g., from friction with the roadway, that can dampen the wheel speed variations. Collecting wheel speed data 115 during a turn (i.e., when the vehicle 101 is not moving substantially straight) can result in inconsistent wheel speed data 115. The computer 105 can determine that the vehicle 101 is moving straight when the respective wheel speeds of the front two wheels 155 differ by less than a difference threshold. That is, when one of the front wheels 155 moves faster than the other of the front wheels 155, the vehicle 101 will turn away from the faster wheel 155. The computer 105 can determine a difference between the wheel speed data 115 from the front wheels 155. When the difference is below the difference threshold, the computer 105 can determine that the vehicle 101 is moving straight, satisfying the straightness condition.

The startup conditions can include an acceleration condition. Because the wheel speed data 115 can be affected by acceleration and deceleration of the vehicle 101, the acceleration condition indicates that the vehicle 101 is moving at a steady speed, reducing wheel speed variations from the vehicle 101 accelerating or decelerating. The computer 105 can determine that the acceleration condition is satisfied when the acceleration of the vehicle 101 is below a predetermined acceleration threshold. The predetermined acceleration threshold can be determined based on empirical testing of forces from wheel 155 and tire combinations as described above.

The computer 105 can determine if the force imbalance persists. The force imbalance "persists" when the force imbalance continues beyond at least one of a time threshold and a distance threshold. The time threshold and the distance threshold can be determined based on empirical testing of tire wear for different times, distances, and forces applied to the wheel 155 from the force imbalance. Upon detecting the force imbalance, the computer 105 can start a timer and/or an odometer and can measure a time elapsed and/or a distance elapsed from detection of the imbalance. Based on the elapsed time and/or distance, the computer 105 can determine whether the force imbalance persists.

The computer 105 can identify a wheel force imbalance fault when the force imbalance persists. For example, the force imbalance may not persist when the force imbalance is caused by a transient source, e.g., flat-spotting, precipitation or debris on the wheel 155, etc. When the force imbalance does not persist, the computer 105 can determine not to identify the wheel force imbalance fault. The wheel force imbalance fault indicates that at least one of the wheels 155 is imbalanced and can require service. Upon identifying the wheel force imbalance fault, the computer 105 can send a notification over the network 125 to a vehicle 101 operator and/or the server 130 and/or a computer at a repair location, the notification indicating the specific wheel 155 that is imbalanced and requires repair.

The computer 105 can determine if a magnitude of one of the determined forces exceeds a magnitude threshold. The magnitude of the determined force can indicate that the wheel 155 is imbalanced regardless of the elapsed time and/or distance. The magnitude threshold can be determined based on, e.g., the empirical testing described above. Based on the lookup table described above, the computer 105 can determine the magnitude of each of the determined forces for each wheel 155. When the magnitude of one of the determined forces exceeds the magnitude threshold, the computer 105 can determine that the wheel 155 associated with the identified force is imbalanced. The magnitude of the determined force can indicate that the wheel 155 requires immediate repair. The computer 105 can then identify a wheel force imbalance fault and send a notification over the network 125 to a vehicle 101 operator and/or the server 130 and/or a computer at a repair location, the notification indicating the specific wheel 155 that is imbalanced and requires repair.

Figure 4:
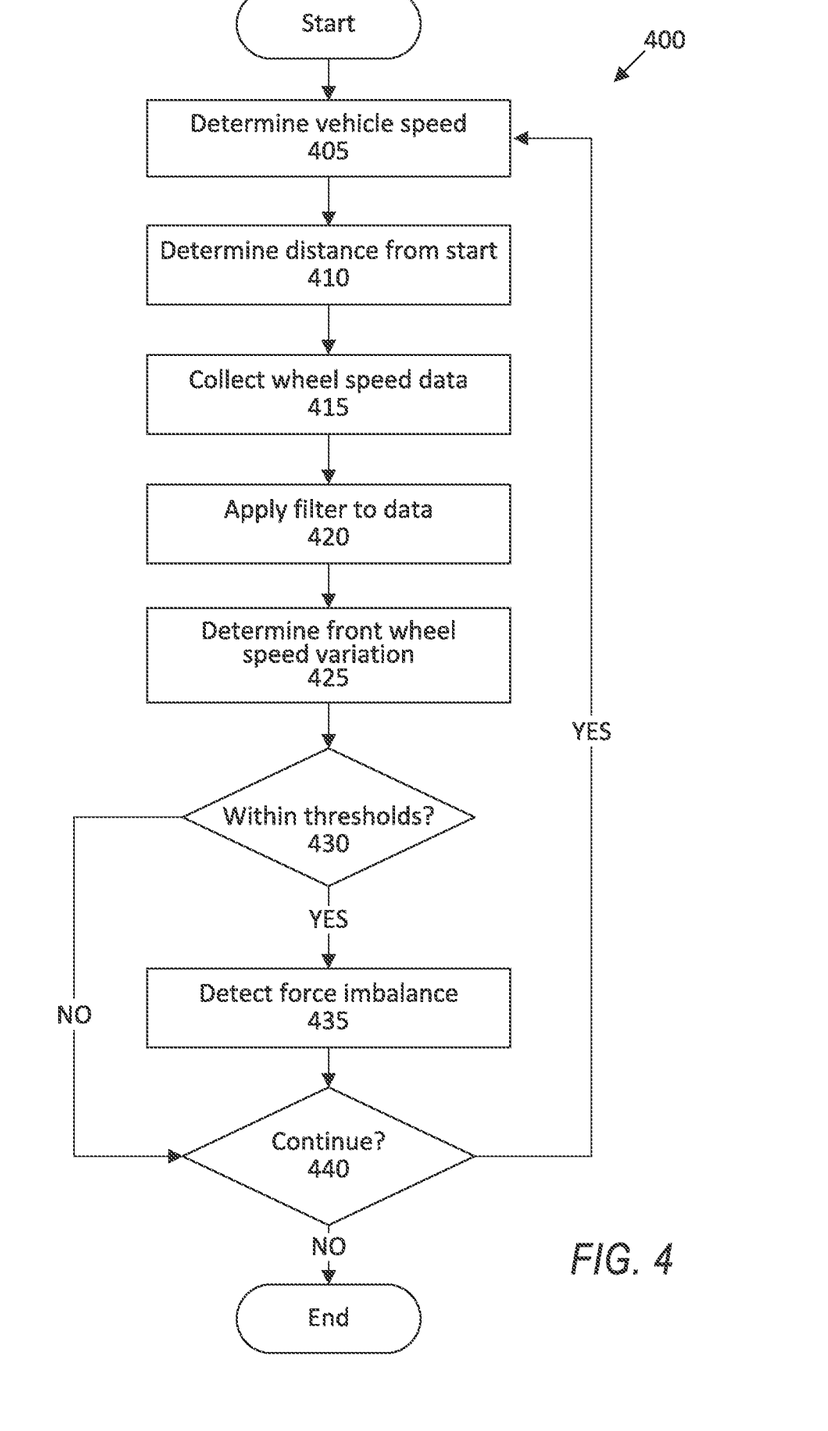
FIG. 4 is a block diagram of an example process for determining conditions to start detecting the force imbalance.

FIG. 4 illustrates an example process 400 for determining to collect data 115 to detect a force imbalance on vehicle wheels 155. The process 400 begins in a block 405, in which the computer 105 determines the vehicle 101 speed. The computer 105 can determine the current vehicle 101 speed based on, e.g., a wheel speed sensor 160.

Next, in a block 410, the computer 105 determines a distance from a start of a route for the vehicle 101. As described above, the wheel speeds can be affected by warming of the tires, so by waiting until a predetermined distance from the start of the route, the temperature of the tires can reach a steady state. The computer 105 can determine the distance based on, e.g., an odometer that was actuated at the start of the route.

Next, in a block 415, the computer 105 collects wheel speed data 115 from the wheels. As described above, each wheel can have a wheel speed sensor 140 that can collect data 115 about rotation of the respective wheel 155. The wheel speed data 115 can be stored in the data store 106.

Next, in a block 420, the computer 105 applies a filter, e.g., a tuned resonance filter, to the raw wheel speed data 115. As described above, the tuned resonance filter removes variations to the wheel speed data 115 from external sources, e.g., road grade, road conditions, engine noise, shake from a misaligned front end, wind, suspension resonance, reduced friction from precipitation, debris (e.g., mud, snow, ice) on the wheel 155, etc. The tuned resonance filter can have a characteristic tuned frequency determined based on a frequency identified from filtered speed data 115, as described above.

Next, in a block 425, the computer 105 determines the wheel speed variation magnitudes for the front wheels 155. When the wheel speed variation magnitudes for the front wheels 155 differ, the vehicle 101 turns. Because turning can affect wheel speed data 115, the computer 105 can wait to determine whether there is a force imbalance until the vehicle 101 is moving straight. When the front wheel speed variation magnitudes are within a difference threshold, the computer 105 can determine that the vehicle 101 is moving straight. The wheel speed variation magnitudes can be stored in the data store 106.

Next, in a block 430, the computer 105 determines whether startup conditions are met. As described above, the startup conditions can include a speed condition, a distance condition, and a straightness condition. The computer 105 can determine whether the vehicle speed is within a speed range, the distance from the start is beyond a predetermined distance, and a difference between the wheel speeds of the front wheels is within a difference threshold, i.e., whether each of the speed condition, the distance condition, and the straightness condition are satisfied. By satisfying the speed, distance, and straightness conditions, the computer 105 can detect the force imbalance with fewer potential variations. If all three conditions are met, the process 400 continues in a block 435. Otherwise, the process 400 continues in a block 440. Alternatively, the process 400 can proceed to the block 435 when one or more of the conditions are met.

Figure 5:
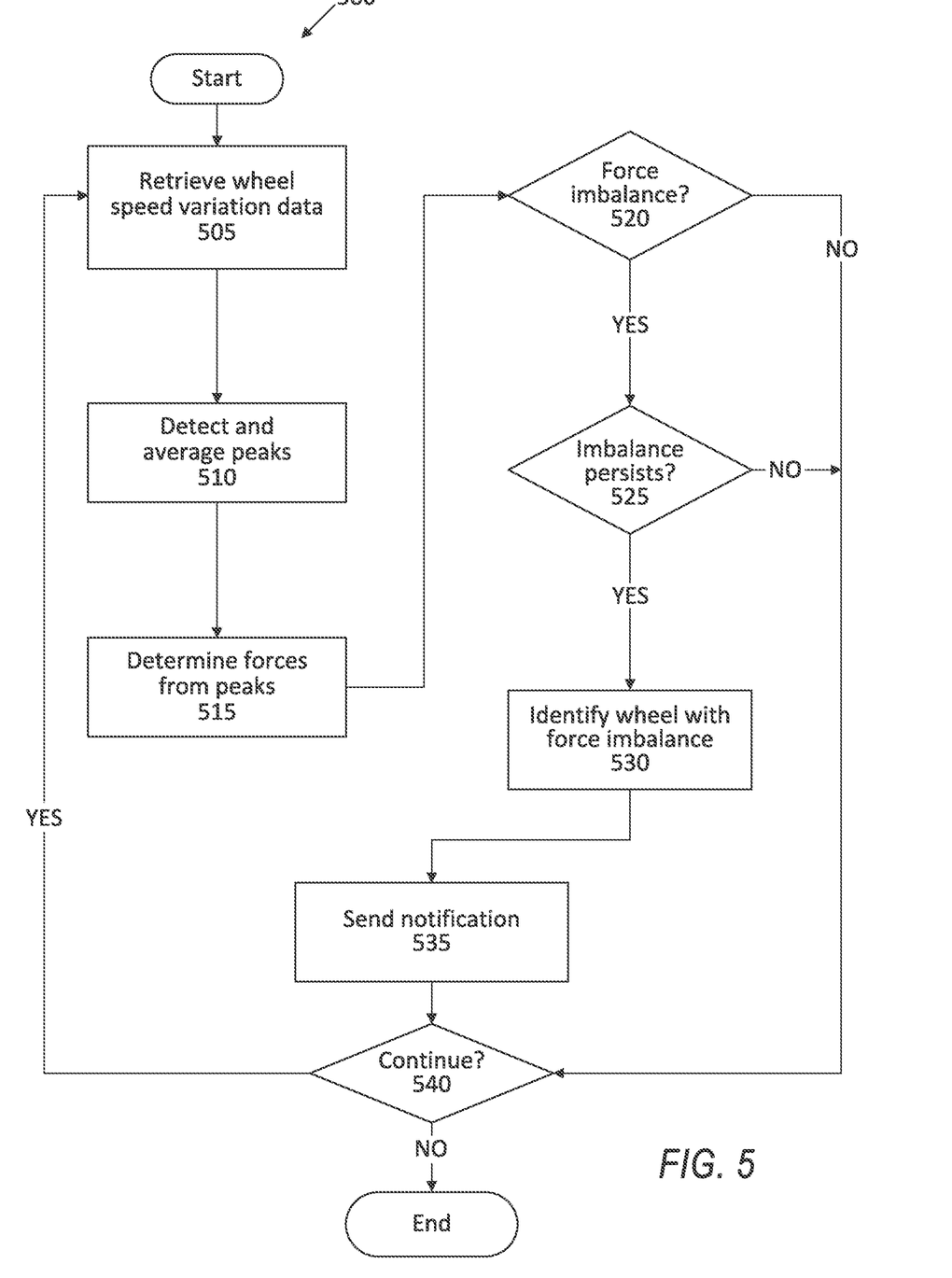
FIG. 5 is a block diagram of an example process for detecting the force imbalance.

In the block 435, the computer 105 determines to detect the force imbalance. The computer 105 can, based on determined forces generated by the wheels 155 from the filtered wheel speed data 115, determine whether there is a force imbalance. The computer 105 can detect the force imbalance with a process such as a process 500 described below.

In the block 440, the computer 105 determines whether to continue the process 400. For example, if the vehicle 101 has stopped and powered off, the computer 105 can determine not to continue the process 400. In another example, if the vehicle 101 continues along the roadway, the computer 105 can determine to continue the process 400. If the computer 105 determines to continue, the process 400 returns to the block 405. Otherwise, the process 400 ends.

FIG. 5 illustrates an example process 500 for detecting a force imbalance. The process 500 begins in a block 505, in which the computer 105 retrieves the wheel speed variation data 115 from each wheel 155 collected previously as described above in the process 400. As described above, the wheel speed sensors 160 can collect data 115 of rotation of each wheel 155, apply the tuned resonance filter to determine the wheel speed variation data 115, and send the data 115 over the network 125 to the computer 105.

Next, in a block 510, the computer 105 detects and averages peak magnitudes of the wheel speed variation data 115. As described above, the computer 105 can, using a peak-determining algorithm, determine peak magnitudes of the wheel speed variation data 115. The computer 105 can average the peak magnitudes to determine an average peak magnitude, as described above.

Next, in a block 515, the computer 105 determines a determined force generated by each wheel 155 based on the average peak magnitude of the wheel speed variation for each wheel 155. As described above, the computer 105 can consult a lookup table or the like correlating average peak magnitudes of wheel speed variations to force values to determine the determined force value correlated with the average peak magnitude of the wheel speed variation. The computer 105 can thus determine the determined force value for each wheel 155.

Next, in a block 520, the computer 105 determine whether there is a force imbalance. As described above, the computer 105 can determine whether one of the wheels 155 is imbalanced by comparing the determined forces of each wheel 155 to a predetermined force threshold. If one of the wheels 155 has a determined force that exceeds the force threshold, the computer 105 can determine that the wheel 155 is imbalanced. If the computer 105 determines that there is a force imbalance, the process 500 continues in a block 525. Otherwise, the process 500 continues in a block 540.

In the block 525, the computer 105 determines whether the force imbalance persists. As described above and shown in the process 600 of FIG. 6 below, the computer 105 can determine whether the force imbalance exceeds at least one of a time threshold, a distance threshold, and a magnitude threshold. When the force imbalance exceeds at least one of the thresholds, the computer 105 can determine that the force imbalance persists. If the computer 105 determines that the force imbalance persists, the process 500 continues in a block 530. Otherwise, the process 500 continues in the block 540.

In the block 530, the computer 105 identifies the wheel 155 that is imbalanced. As described above, the computer 105 can identify the specific wheel 155 that is imbalanced based on the determined forces generated by each wheel 155 determined from the lookup table described above, i.e., the wheel 155 that has a determined force that exceeds the force threshold.

Next, in a block 535, the computer 105 identifies a wheel force imbalance fault and sends a notification indicating the imbalanced wheel 155. The computer 105 can send the notification over the network 125 to a vehicle 101 operator and/or the server 130 and/or a computer at a repair location. The notification can identify the imbalanced wheel 155 and request repair for the imbalanced wheel 155.

In the block 540, the computer 105 determines whether to continue the process 500. For example, the computer 105 can determine to continue the process 500 when the vehicle 101 is still moving on the roadway. In another example, the computer 105 can determine not to continue the process 500 upon arriving at the repair location to fix the imbalanced wheel or if the vehicle 101 is stopped. If the computer 105 determines to continue, the process 500 returns to the block 505 to retrieve more data 115. Otherwise, the process 500 ends.

Figure 6:
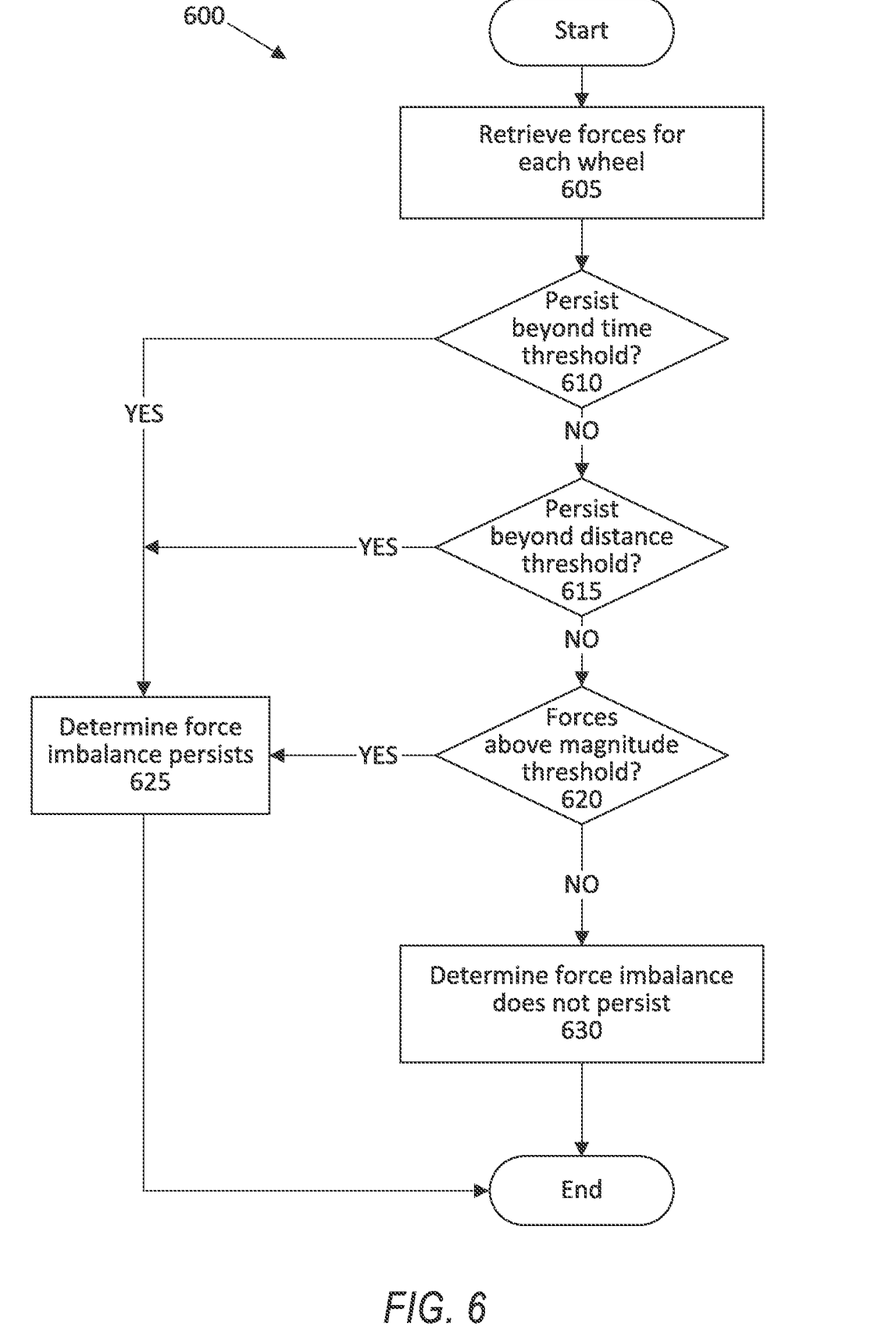
FIG. 6 is a block diagram of an example process for determining persistence of the detected force imbalance.

FIG. 6 illustrates an example process 600 for determining that the force imbalance persists. The process 600 begins in a block 605, in which the computer 105 retrieves the determined force determinations for each wheel 155. From the force determinations, the computer 105 can identify the imbalanced wheel 155. As described above, upon detecting the force imbalance indicating force imbalance, the computer 105 can actuate a timer and/or an odometer to measure an elapsed time and/or distance from the point of detection of the force imbalance.

Next, in a block 610, the computer 105 determines whether the force imbalance persists by determining whether a time duration of the force imbalance exceeds a time threshold. As described above, when the elapsed time exceeds the time threshold, the computer 105 can determine that the force imbalance indicates a wheel 155 that requires repair. If the elapsed time exceeds the time threshold, the process 600 continues in a block 625. Otherwise, the process 600 continues in a block 615.

In the block 615, the computer 105 determines whether the force imbalance persists by determining whether a distance duration of the force imbalance exceeds a distance threshold. As described above, when the elapsed distance exceeds the distance threshold, the computer 105 can determine that the force imbalance indicates a wheel 155 that requires repair for the wheel 155. If the elapsed distance exceeds the distance threshold, the process 600 continues in the block 625. Otherwise, the process 600 continues in a block 620.

In the block 620, the computer 105 compares the magnitude of the determined force generated by the imbalanced wheel 155 to a magnitude threshold. As described above, the magnitude of the determined force can indicate that the wheel 155 is imbalanced regardless of the elapsed time and/or distance. If the magnitude of the determined force exceeds the magnitude threshold, the process 600 continues in the block 625. Otherwise, the process 600 continues in a block 630.

In the block 625, the computer 105 determines that the force imbalance persists enough to identify a wheel force imbalance fault. When the force imbalance persists, the force imbalance can cause damage to vehicle components 120, e.g., tires, steering, suspension, ball joints, etc. Upon detecting that the force imbalance persists, the computer 105 can identify the wheel force imbalance fault and send a notification over the network 125 indicating that the imbalanced wheel 155 requires repair. Following the block 625, the process 600 ends. In the example process 600, the computer 105 can determine that the force balance persists when the force balance exceeds at least one of the time threshold, the distance threshold, and the magnitude threshold. Alternatively, the computer 105 can determine that the force balance persists when the force imbalance exceeds two or more of the time threshold, the distance threshold, and the magnitude threshold.

In the block 630, the computer 105 determines that the force imbalance does not persist. The computer 105 can continue to collect data 115 to detect force imbalances and operate the vehicle 101 according to the force imbalances. Following the block 630, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine that a distance traveled by a vehicle from a location indicating a start of a route exceeds a predetermined distance;
   then, collect, from one or more wheel speed sensors in communication with the processor, wheel speed data from each of a plurality of wheels;
   identify a wheel having a force imbalance based on the collected wheel speed data; and
   identify a wheel force imbalance fault when a distance duration of the force imbalance exceeds a distance threshold or a time duration of the force imbalance exceeds a time threshold.

2. The system of claim 1, wherein the instructions further include instructions to apply a tuned resonance filter to filter at least one of road noise and vibrations from road variation.

3. The system of claim 1, wherein the instructions to identify the wheel further include instructions to identify a plurality of peaks of the wheel speed data.

4. The system of claim 1, wherein the instructions to identify the wheel force imbalance fault further include instructions to determine at least one of the distance threshold and the time threshold based on a magnitude of the force imbalance.

5. The system of claim 1, wherein the instructions to collect wheel speed data further include instructions to determine that a vehicle is moving straight and then and only then to start collecting the wheel speed data from the wheels of the vehicle.

6. The system of claim 5, wherein the instructions to determine that the vehicle is moving straight further include instructions to determine, from the wheel speed data, a first wheel speed for a first front wheel and a second wheel speed for a second front wheel and to determine that the vehicle is moving straight when the first wheel speed is within a predetermined speed threshold of the second wheel speed.

7. The system of claim 1, wherein the instructions to identify the wheel further include instructions to identify a sine wave indicating a variation of the wheel speed from the wheel speed data.

8. The system of claim 1, wherein the instructions to identify the wheel force imbalance fault further include instructions to determine whether the wheels require immediate repair based on a magnitude of the force imbalance.

9. The system of claim 1, wherein the instructions to identify the wheel force imbalance fault further include instructions to determine a magnitude of the force imbalance and then to identify the wheel force imbalance fault when the magnitude exceeds a magnitude threshold.

10. The system of claim 1, wherein the instructions further include instructions to determine whether an identified second wheel has a second force imbalance and to identify a wheel force imbalance fault for the second wheel when the second force imbalance exceeds at least one of the distance threshold and the time threshold.

11. A method, comprising:
   determining that a distance traveled by a vehicle from a location indicating a start of a route exceeds a predetermined distance;
   then, collecting, from one or more wheel speed sensors, wheel speed data from each of a plurality of wheels;
   identifying one of the wheels having a force imbalance based on the collected wheel speed data; and
   identifying a wheel force imbalance fault when a distance duration of the force imbalance exceeds a distance threshold or a time duration of the force imbalance exceeds a time threshold.

12. The method of claim 11, further comprising applying a tuned resonance filter to filter at least one of road noise and vibrations from road variation.

13. The method of claim 11, further comprising determining at least one of the distance threshold and the time threshold based on a magnitude of the force imbalance.

14. The method of claim 11, further comprising determining a magnitude of the force imbalance and then identifying the wheel force imbalance fault when the magnitude exceeds a magnitude threshold.

15. A system, comprising:
   a plurality of vehicle wheels;
   a respective wheel speed sensor for each vehicle wheel;
   means for determining that a distance traveled by a vehicle from a location indicating a start of a route exceeds a predetermined distance;
   means for collecting, from the wheel speed sensors, wheel speed data for each of a plurality of vehicle wheels;
   means for identifying one of the wheels having a force imbalance based on the wheel speed data; and
   means for identifying a wheel force imbalance fault when the force imbalance exceeds at least one of a distance threshold and a time threshold.

16. The system of claim 15, further comprising means for applying a tuned resonance filter to filter at least one of road noise and vibrations from road variation.

17. The system of claim 15, further comprising means for determining at least one of the distance threshold and the time threshold based on a magnitude of the force imbalance.

18. The system of claim 15, further comprising means for determining whether the wheels require immediate repair based on a magnitude of the force imbalance.

19. The system of claim 15, further comprising means for determining a magnitude of the force imbalance and then identifying the wheel force imbalance fault when the magnitude exceeds a magnitude threshold.

* * * * *